US010620974B2

(12) United States Patent
Onu et al.

(10) Patent No.: US 10,620,974 B2
(45) Date of Patent: Apr. 14, 2020

(54) GALLERY CONTROL WITH DYNAMICALLY DETERMINED CONTROL TEMPLATE REPLICA SIZES

(71) Applicant: Microsoft Technology Licensing, LLC, Redmond, WA (US)

(72) Inventors: Laura S. Onu, Redmond, WA (US); Ahmed Mohamed Abbas Helmy Mohamed Kotb, Redmond, WA (US); Yasser Elsayed Shaaban, Seattle, WA (US); Mariyan D. Fransazov, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 15/786,382

(22) Filed: Oct. 17, 2017

(65) Prior Publication Data
US 2018/0232242 A1 Aug. 16, 2018

Related U.S. Application Data

(60) Provisional application No. 62/458,449, filed on Feb. 13, 2017.

(51) Int. Cl.
*G06F 3/0484* (2013.01)
*G06F 9/451* (2018.01)
(Continued)

(52) U.S. Cl.
CPC .......... *G06F 9/451* (2018.02); *G06F 3/0484* (2013.01); *G06F 8/36* (2013.01); *G06F 8/38* (2013.01); *G06F 9/54* (2013.01)

(58) Field of Classification Search
CPC .......... G06F 3/00; G06F 3/048; G06F 3/0481; G06F 3/0484; G06F 17/00; G06F 17/21;
(Continued)

(56) References Cited

U.S. PATENT DOCUMENTS 8,042,039 B2   10/2011   Anderson
8,578,276 B2   11/2013   Palmieri
(Continued)

FOREIGN PATENT DOCUMENTS

CN   101908044 A   5/2010

OTHER PUBLICATIONS

"Resizing panel to fit it content", http://answers.unity3d.com/questions/885612/46-gui-resizing-panel-to-fit-it-content.html, Published on: Jan. 25, 2015, 2 pages.

*Primary Examiner* — Xiomara L Bautista
(74) *Attorney, Agent, or Firm* — Fiala & Weaver P.L.L.C.

(57) ABSTRACT

Techniques are described for rendering a gallery control to a graphical user interface (GUI), the gallery control including first and second template replicas. For each template replica, a GUI-rendering component is instructed to render the template replica, a read application programming interface (API) call is placed to the GUI-rendering component, a target size of the template replica is determined based on the results of the read API call, and a write API call is scheduled to instruct the GUI-rendering component to update the dimension of the template replica to the target size. In response to determining that the target size of the dimension of either template replica is different than a default size, a write API call is placed to the GUI-rendering component to update an offset associated with each template replica and the scheduled write API calls are placed to the GUI-rendering component.

20 Claims, 8 Drawing Sheets

(51) Int. Cl.
*G06F 9/54* (2006.01)
*G06F 8/36* (2018.01)
*G06F 8/38* (2018.01)

(58) Field of Classification Search
CPC ........ G06F 17/24; G06F 17/248; G06F 17/30;
G09G 5/00; G06Q 30/02; G06Q 50/00
See application file for complete search history.

(56) References Cited

U.S. PATENT DOCUMENTS

| | | |
|---|---|---|
| 8,832,590 B1 | 9/2014 | Al-Mohssen |
| 8,850,306 B2 | 9/2014 | Sunderland et al. |
| 8,887,073 B2 | 11/2014 | Kruglick |
| 9,195,365 B2 | 11/2015 | Williams |
| 9,569,501 B2 | 2/2017 | Chedeau et al. |
| 2002/0169803 A1* | 11/2002 | Sampath ............... G06F 17/212 715/234 |
| 2007/0033522 A1 | 2/2007 | Lin et al. |
| 2014/0006913 A1* | 1/2014 | Gopalakrishna ...... G06F 16/986 715/200 |
| 2015/0278166 A1 | 10/2015 | Hanechak |

* cited by examiner

GALLERY CONTROL WITH DYNAMICALLY DETERMINED CONTROL TEMPLATE REPLICA SIZES

CROSS-REFERENCE TO RELATED APPLICATIONS

This application claims priority to U.S. Provisional Patent Application No. 62/458,449, filed Feb. 13, 2017 and entitled "Dynamically Determined Gallery Template Size for Declarative Applications," the entirety of which is incorporated by reference herein.

BACKGROUND

Developers may program an application to render a control to a graphical user interface (GUI) thereof, wherein the control includes several elements, each of which is used to display different data items obtained from a data source at runtime. For example, each element may comprise an instance (or replica) of a control template and may be used as a container for displaying content and/or inner controls obtained from a corresponding record of a data source at runtime.

If the size of the data items that will be obtained from the data source cannot be determined during application development, then the developer faces a problem. If the control template has a fixed size, then it is possible that data items will overflow the control template replica into which they are rendered at runtime. To deal with this issue, the developer may program the application to truncate the data items within the control template replica (e.g., truncate text after a fixed number of characters) or enable scrolling (e.g., providing an HTML viewer control with scrolling). The former approach is disadvantageous because it does not show all the data and the latter approach is disadvantageous because it requires showing nested scrollbars and user interaction therewith to view all the data.

The developer may also try to address this problem by programming the application to show the data that does not fit within the control template replica on a different screen of the GUI. However, this approach is not user-friendly as it requires the user to navigate back and forth between GUI screens to see the data.

The developer may also try to estimate the size of the data and set the size of the control template to accommodate a maximum possible size. This has the disadvantage of showing unneeded gaps when the data items do not utilize the allotted space. Also, there is no guarantee that the estimated maximum possible size will handle all cases.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for rendering a gallery control to a graphical user interface (GUI), the gallery control including first and second template replicas. For each template replica, a GUI-rendering component is instructed to render the template replica, a read application programming interface (API) call is placed to the GUI-rendering component, a target size of the template replica is determined based on the results of the read API call, and a write API call is scheduled to instruct the GUI-rendering component to update the dimension of the template replica to the target size. In response to determining that the target size of the dimension of either template replica is different than a default size, a write API call is placed to the GUI-rendering component to update the an offset associated with each template replica and the scheduled write API calls are placed to the GUI-rendering component.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
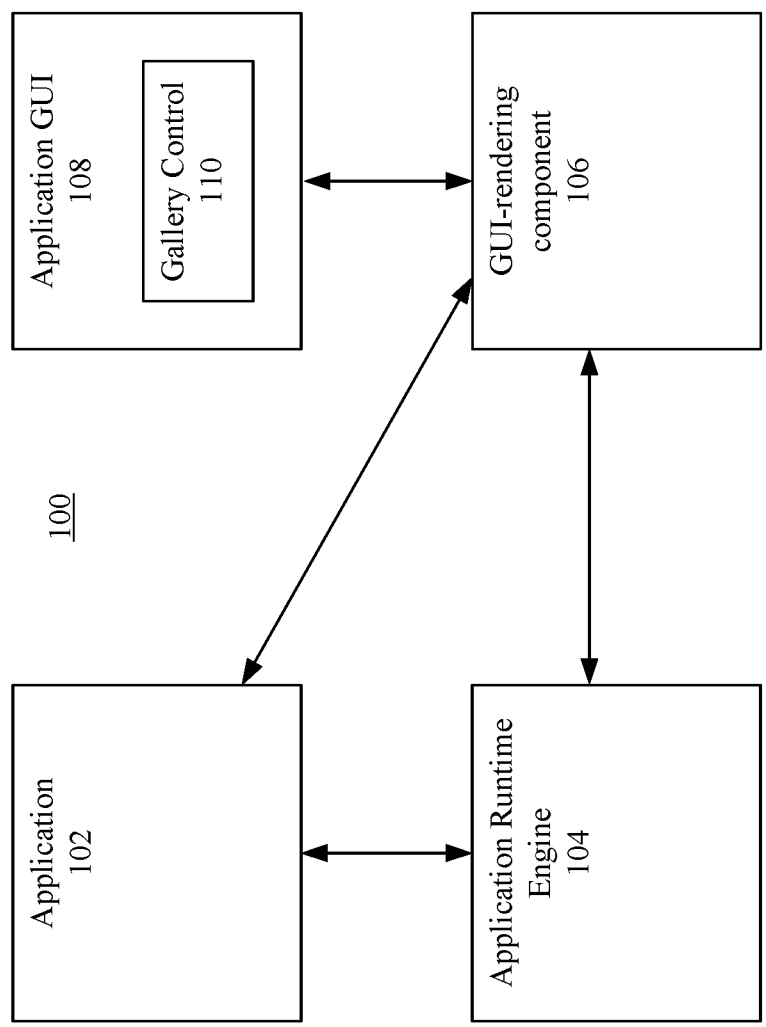
FIG. 1 is a block diagram of an example system for rendering a gallery control to a graphical user interface (GUI), in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example embodiments. The scope of the present application is not limited to the disclosed embodiments, but also encompasses combinations of the disclosed embodiments, as well as modifications to the disclosed embodiments. References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

As used herein, the term "developer" is intended to broadly encompass any person who creates or participates in creating a computer program, including individuals with coding skills and individuals with little or no coding skills.

II. Example Embodiments

As noted in the Background Section, above, developers may program an application to render a control to a GUI thereof, wherein the control includes several elements, each of which is used to display different data items obtained from a data source at runtime. Each element may comprise an instance (or replica) of a control template and may act as a container for displaying content and/or inner controls obtained from a corresponding record obtained of a data source at runtime. Such a control may be referred to herein as a "gallery control." For example, Microsoft® Power-Apps® (a declarative "low-code" programming tool that enables users with little or no coding experience to develop business applications) enables developers to insert a gallery control into their application GUI and bind it to a data source through a series of declarative actions.

If the size of the data items that will be obtained from the data source cannot be determined during application development, then the developer faces a problem. If the control template has a fixed size, then it is possible that data items will overflow the control template replica into which they are rendered at runtime. To deal with this issue, the developer may program the application to truncate the data items within the control template replica (e.g., truncate text after a fixed number of characters) or enable scrolling (e.g., providing an HTML viewer control with scrolling). The former approach is disadvantageous because it does not show all the data and the latter approach is disadvantageous because it requires showing nested scrollbars and user interaction therewith to view all the data.

The developer may also try to address this problem by programming the application to show the data that does not fit within the control template replica on a different screen of the GUI. However, this approach is not user-friendly as it requires the user to navigate back and forth between GUI screens to see the data.

The developer may also try to estimate the size of the data and set the size of the control template to accommodate a maximum possible size. This has the disadvantage of showing unneeded gaps when the data items do not utilize the allotted space. Also, there is no guarantee that the estimated maximum possible size will handle all cases.

Example embodiments described herein are directed to techniques for rendering a gallery control to a GUI that overcome one or more of the foregoing problems. In accordance with embodiments described herein, each template replica in the gallery control may have a variable dimension size (e.g., height or width) that is determined based on the size of the data from the data source record that populates it. Each template replica in the gallery control is first rendered at a default dimension size and then that dimension size is updated (i.e., to be larger or smaller) to accommodate the data from the corresponding data source record. In accordance with such embodiments, the rendered gallery control will be displayed to a user at the appropriate dimension size with no special efforts from the application developer. Accordingly, such embodiments ensure that all the data within the gallery control is viewable by an end user of the application without requiring the user to scroll within template replicas or navigate to a different GUI screen. This approach also obviates the need for a developer to utilize an estimated maximum control template size that may nevertheless be too small in some cases or that may cause unneeded gaps to be shown when data from a data source record does not fill the allotted space.

In further embodiments, read application programming interface (API) calls are placed to a GUI-rendering component (e.g., a browser) to determine a target size for each of a plurality of template replicas within a rendered gallery control. Write API calls are then placed to the GUI-rendering component to update such template replicas to their corresponding target sizes and offsets. All of the read API calls are placed before the write API calls to prevent an undesirable phenomenon known as browser thrashing.

In still further embodiments, after the gallery control is rendered, each template replica of the gallery control is monitored for any changes to the data items rendered therein. If a change is detected, the sizing and offsets associated with each template replica in the gallery control are checked and updated, if necessary, thus ensuring that the template replicas continue to accommodate the data items rendered therein.

To help illustrate the foregoing, FIG. 1 will now be described. In particular, FIG. 1 is a block diagram of an example system 100 for rendering a gallery control to a graphical user interface (GUI), in accordance with an embodiment. As shown in FIG. 1, system 100 includes an application 102, an application runtime engine 104, a GUI-rendering component 106, and an application GUI 108. As further shown in FIG. 1, application GUI 108 includes a gallery control 110.

In accordance with this example, application 102 is a computer program developed by a developer (or other user) to render gallery control 110 to application GUI 108. For instance, a developer may use a development tool to cause gallery control 110 to be included within application GUI 108. In one embodiment, the development tool comprises Microsoft® PowerApps®, although this example is not intended to be limiting. In an embodiment in which the development tool is Microsoft® PowerApps®, the developer may declaratively define the gallery control in a manner that requires little or no coding. Thus, the developer need not be an experienced programmer in this scenario.

As part of defining gallery control 110, the developer may bind or connect gallery control 110 to a data source. The data source may comprise an entity (e.g., application, service, storage device, or the like) from which data will be obtained at runtime of application 102 for insertion into gallery control 110. As part of defining gallery control 110, the developer may also define (e.g., through creation, selection or otherwise) a control template. At runtime of application 102, gallery control 110 is rendered by creating an instance of this predefined control template (referred to herein as a "template replica") for each record in the data source. Each template replica is populated at runtime with one or more data items from a corresponding record in the data source and, as will be discussed herein, is dynamically re-sized to accommodate such data item(s).

Application runtime engine 104 comprises software that is configured to run applications, such as application 102, so that they may perform their intended functions. In an embodiment in which application 102 is developed using Microsoft® PowerApps®, application runtime engine 104 comprises a PowerApps® Player, although this example is not intended to be limiting and persons skilled in the relevant art(s) will appreciate that application runtime engine 104 may comprise any suitable software platform for executing an application such as application 102.

GUI-rendering component 106 comprises software that is configured to render a GUI, such as application GUI 108, to a display screen. In one embodiment, GUI-rendering component 106 comprises a Web browser, although this example is not intended to be limiting.

When application 102 is executed by application runtime engine 104, application runtime engine 104 interacts with GUI-rendering component 106 to cause GUI-rendering component 106 to provide application 102 with access to a dedicated instance of a rendering window within which to render application GUI 108. During execution of application 102, application 102 may interact with GUI-rendering component 106 to cause content, including gallery control 110, to be rendered to such instance of a rendering window, which in this case comprises application GUI 108. For instance, and as shown in FIG. 1, application 102 interacts with GUI-rendering component 106 to cause GUI-rendering component 106 to render gallery control 110 to application UI 108. In an embodiment, application 102 interacts with GUI-rendering component 106 via application programming interface (API) calls.

In embodiments, each of application 102, application runtime engine 104 and GUI-rendering component 106 may comprise software executing on the same device (e.g. a computing device such as that described below in reference to FIG. 10) and application GUI 108 may be rendered to a display that is integrated with or connected to the device. In an alternate embodiment, one or more of application 102, application runtime engine 104 and GUI-rendering component 106 may comprise software executing on a different device than a device having a display to which application GUI 108 is rendered. In still further embodiments, at least one of application 102, application runtime engine 104 and GUI-rendering component 106 may be executed on a different device from the other one(s) of application 102, application runtime engine 104 and GUI-rendering component 106.

Figure 2:
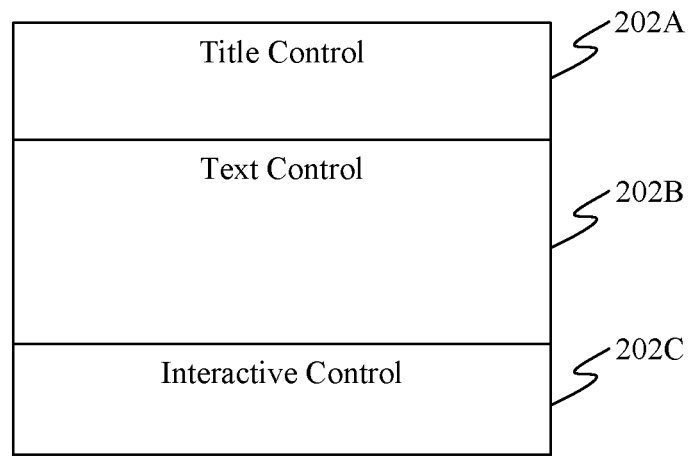
FIG. 2 is a block diagram of an example control template, in accordance with an embodiment.

To further illustrate the foregoing, FIG. 2 depicts an example control template 200 in accordance with an embodiment. As noted above, a gallery control is a control that includes a number of replicated instances of a predefined control template, wherein each template replica is populated by one or more data items from a corresponding record in a data source. The control template may itself includes one or more inner controls, each of which may be populated with data item(s) from the corresponding record. For instance, as shown in FIG. 2, example control template 200 of FIG. 2 is defined to include three inner controls: an inner control 202A, an inner control 202B and an inner control 202C. Each of these three inner controls may be populated with a different data item from a corresponding data record. While FIG. 2 shows a control template having three inner controls, it should be understood that this is an example only and a control template can have any number of inner controls and, furthermore, each inner control may include zero or more nested inner controls.

In example control template 200, each inner control is of a particular inner control type. Thus, for example, inner control 202A is a title control, inner control 202B is a text control, and inner control 202C is an image control. Still other inner control types may be included, such as an interactive control, or the like. In an embodiment, a title control is populated with a title from a data source record, a text control is populated with a text description from the data source record, an image control is populated with an image from the data source record, and an interactive control is populated with an interactive element from the data source record. In such an embodiment, the data that is used to populate an inner control corresponds to the inner control type. However, in other embodiments, there may be no association between a type of inner control and the data used to populate it.

Figure 3:
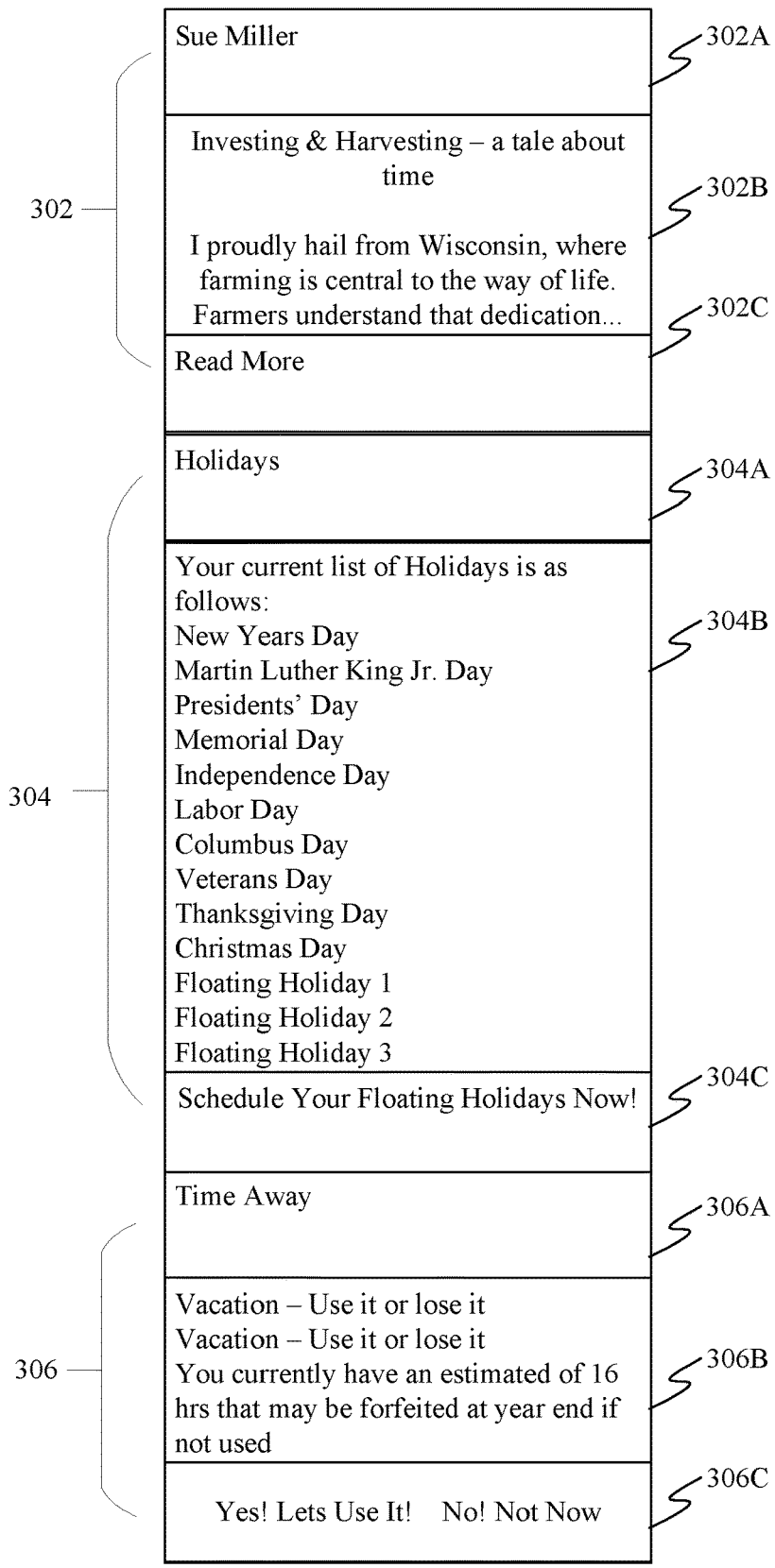
FIG. 3 depicts an example gallery control that is rendered using the control template of FIG. 2, in accordance with an embodiment.

To further illustrate the concept of a gallery control, FIG. 3 depicts an example gallery control 300 that is rendered to a GUI (e.g., application GUI 108) using control template 200 of FIG. 2. As noted above, control template 200 is replicated once for each record in the data source to which gallery control 300 is connected, such that data from each record in the data source is used to populate a corresponding template replica. It should be noted that any number of records may exist in a data source. In embodiments, the records in the data source correspond to the template replicas of the gallery control on a one-to-one basis such that the number of template replicas in the gallery control is dependent on how many records are present in the data source. For example, if there are three records in the data source, then the gallery control will include three replicated instances of the control template and populate each template replica with data from a corresponding record in the data source.

In accordance with this example, gallery control 300 is connected to a data source with at least three records. Thus, as shown in FIG. 3, gallery control 300 includes three template replicas: template replica 302, template replica 304, and template replica 306, wherein each of template replica 302, 304, and 306 represents an instance of control template 200 that has been populated with data items from a corresponding record in the data source and automatically resized to accommodate such data items. Furthermore, as noted above, each template replica includes instances of the inner controls of control template 200. For example, and as shown in FIG. 3, template replica 302 includes an inner control 302A that is an instance of inner control 202A, an inner control 302B that is an instance of inner control 202B, and an inner control 302C that is an instance of inner control 202C. Likewise, template replica 304 includes an inner control 304A that is an instance of inner control 202A, an inner control 304B that is an instance of inner control 202B, and an inner control 304C that is an instance of inner control 202C, and template replica 306 includes an inner control 306A that is an instance of inner control 202A, an inner control 306B that is an instance of inner control 202B, and an inner control 306C that is an instance of inner control 202C.

Although gallery control 300 is shown to include three template replicas, it is to be understood that gallery control 300 may include any number of template replicas. In some embodiments, if a gallery control includes more template replicas than can be viewed in a gallery control window at one time, then a scrolling mechanism (e.g., a scroll bar) is provided to enable a user to scroll up or down to view additional template replicas within the gallery control.

While each template replica in gallery control 300 includes the same set of inner controls, a height of each template replica is dynamically adjusted (in a manner that will be described herein) to account for the size of those inner controls, which themselves may be dynamically adjusted. In further detail, when a template replica is rendered, the template replica is initially rendered using a default height and at an initial offset that is determined based on the default height. This offset defines a rendering distance from a common starting point (i.e., a top of the gallery control). For instance, if each template replica is assigned a default height of 100 pixels, the first template replica would have an offset of 0 pixels, the second template replica would have an offset of 100 pixels, the third template replica would have an offset of 200 pixels, and so on. However, once each template replica is populated with data from a corresponding data source record, the height may be updated in accordance with a method described herein to properly accommodate the data populated therein. For example, if the inner controls when populated with data would not fully utilize the space within the template replica such that gaps would result, the height of the template replica may be reduced to better fit those inner controls (i.e., reduce empty space within the template replica). Likewise, if the inner controls when populated with data would overflow the boundaries of the template replica, the height of the template replica may be increased to accommodate those inner controls.

Furthermore, in accordance with the techniques described herein, if the height of a template replica is updated, then the offset associated with each template replica that follows that template replica will also be updated to avoid gaps between template replicas (in the event of a decrease in template replica height) or to avoid overlap between template replicas (in the event of an increase in template replica height). For instance, if in the height of a template replica is changed from 100 pixels to 80 pixels, then the offset for each template replica that follows that template replica will be reduced by 20 pixels. Alternatively, if the height of a template replica is changed from 100 pixels to 120 pixels, then the offset for each template replica that follows that template replica will be increased by 20 pixels.

For example, and as shown in FIG. 3, inner controls 302A, 302B and 302C of template replica 302 are each populated with a corresponding title, text description, and interactive element from a first record of a data source. The height of those inner controls has been adjusted as necessary to accommodate their respective content. In this example, such inner controls, after any such adjustment, fit comfortably within the default height of template replica 302 and, consequently, the height of template replica 302 has not been updated.

As further shown in FIG. 3, inner controls 304A, 304B and 304C of template replica 304 are each populated with a corresponding title, text description, and interactive element from a second record of the data source. The height of those inner controls has been adjusted as necessary to accommodate their respective content. In this example, the height of inner control 304B has been increased to accommodate the text description populated therein. Consequently, the height of template replica 304 has also been increased to account for this increase in the height of inner control 304B. Furthermore, to account for this increase in the height of template replica 304, the offset at which template replica 306 is rendered has been increased so that template replica 306 will be non-overlapping with respect to template replica 304.

A manner in which a gallery control is rendered to a GUI and in which template replicas thereof are dynamically resized will now be described in reference to flowchart 400 of FIG. 4. The method of flowchart 400 may be performed, for example, by application 102 as described above in reference to system 100 of FIG. 1. However, the method is not limited to that embodiment and persons skilled in the art will understand the method of flowchart 400 could be implemented by other systems or components.

In the following description of flowchart 400, the rendering of a first template replica and a second template replica within a gallery control will be described. However, it is to be understood that the method can be extended to any number of template replicas within a gallery control and that first and second template replicas are discussed herein merely for the sake of illustration and ease of understanding. Furthermore, although examples described herein may refer to dynamically modifying the height of a template replica, it will be understood by a person skilled in the relevant art(s) that the method may be used to dynamically modify any dimension of a template replica.

Figure 4:
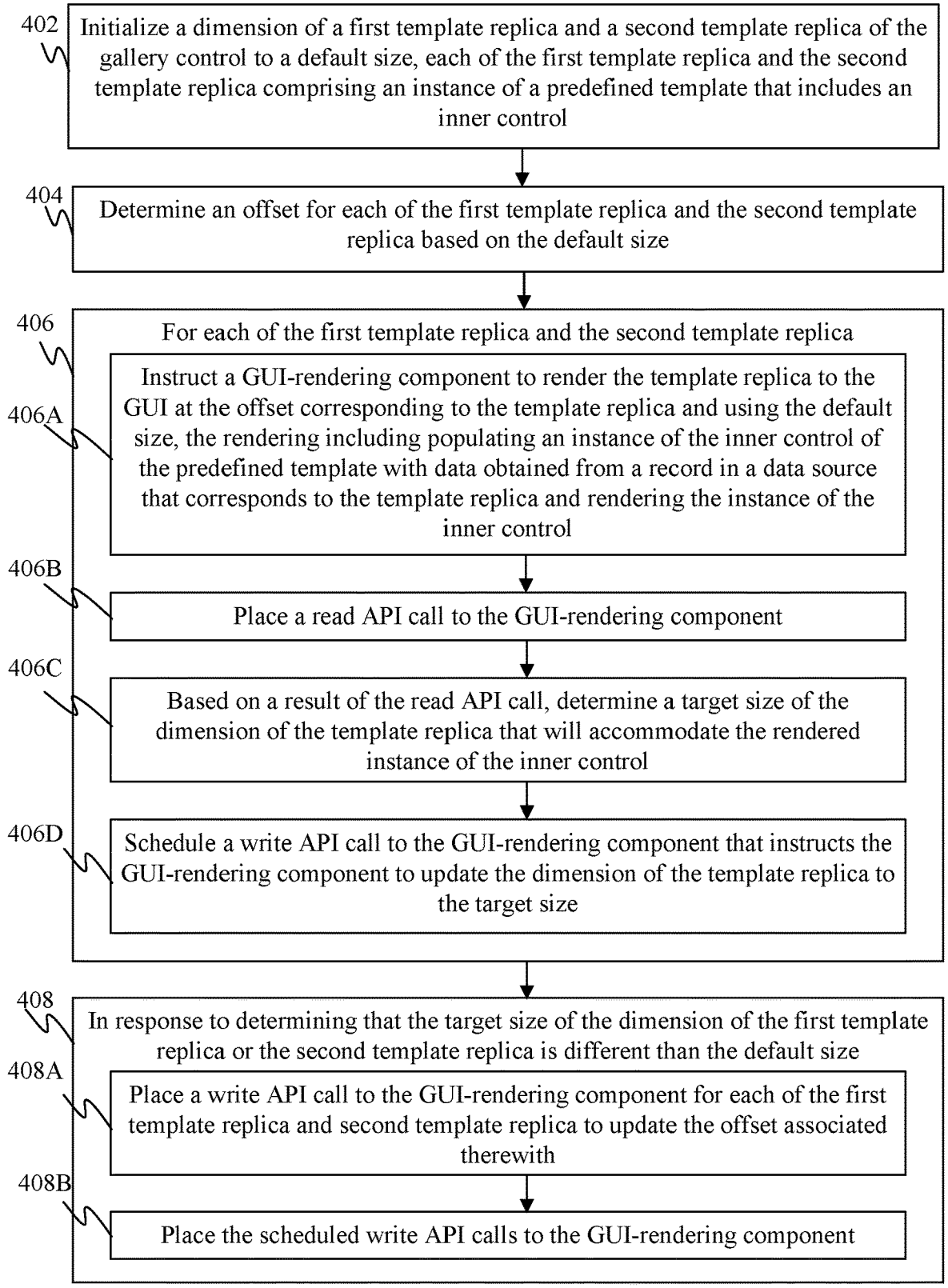
FIG. 4 shows a flowchart of a method for rendering a gallery control to a graphical user interface (GUI), in accordance with an embodiment.

As shown in FIG. 4, the method of flowchart 400 begins at step 402 in which a dimension of a first template replica and a second template replica of the gallery control is initialized to a default size, where each of the first template replica and the second template replica comprise an instance of a predefined template that includes an inner control. For example, and with continued reference to FIG. 1, application 102 may assign a default size to a dimension of each of the first second replica and the second template replica. The default size may be based on a size associated with the predefined template (e.g., control template 200) that has been defined or selected by a developer of application 102, although this example is not intended to be limiting. Application 102 may store the default size of each template replica in a cache or other data structure in memory for tracking purposes.

At step 404, an offset is determined for each of the first template replica and the second template replica based on the default size. For example, and with continued reference to FIG. 1, application 102 may determine an offset for each of the first template replica and the second template replica based on the default size. For example, in an embodiment, application 102 may assign 0 pixels or some other starting value to a topmost template replica in a gallery control and then assigns an offset to each subsequent template replica in the gallery control by adding a multiple of the default size to the starting value. In further accordance with the example in which the starting value is 0 pixels, if the default size is 100 pixels, then application 102 may assign an offset of 100 pixels to the template replica immediately below the topmost template replica, an offset of 200 pixels to the following template replica, and so on. In an embodiment, application 102 may store the offset assigned to each template replica or other suitable data structure in memory for tracking purposes.

At step 406, steps 406A, 406B, 406C, and 406D are performed for each of the first template and the second template replica (and for each additional template replica if there are more than two to be rendered to the GUI).

At step 406A, a GUI-rendering component is instructed to render the template replica to the GUI at the offset corresponding to the template replica and using the default size. For example, and with continued reference to FIG. 1, application 102 may instruct GUI-rendering component 106 (e.g., via one or more suitable API calls) to render the template replica to application GUI 108 at the offset that was assigned to the template replica during step 404 and using the default size that was assigned to the template replica in step 402.

Rendering the template replica to the GUI in step 406A includes populating an instance of the inner control of the predefined template with data obtained from a record in a data source (wherein the record in the data source corresponds to the template replica) and then rendering the instance of the inner control. For example, in reference to example control template 200 of FIG. 2 and example template replica 302 of FIG. 3, the rendering of template replica 302 to application GUI 108 includes populating an instance of inner control 202A (i.e., inner control 302A) with data from a record in the data source and then rendering the instance of the inner control populated with such data.

At step 406B, a read API call is placed to the GUI rendering component. For example, and with continued reference to FIG. 1, application 102 places a read API call to GUI-rendering component 106. The purpose of this read API call is to determine the size of a dimension (e.g., height) of the instance of the inner control that was rendered in response to the execution of step 406A. It is possible that this step may require placing more than one read API calls to the GUI rendering component. In one embodiment, this step comprises reading from a document object model (DOM) of a webpage that is maintained by the GUI rendering component to determine the size of the dimension of the rendered instance of the inner control.

At step 406C, based on a result of the read API call, a target size of the dimension of the template replica is determined that will accommodate the rendered instance of the inner control. For example, and with continued reference to FIG. 1, based on a result of the read API call, application 102 may determine a target size of the dimension of the template replica that will accommodate the rendered instance of the inner control. For example, if the read API call result indicates that the size of the dimension of the rendered instance of the inner control is larger than the default size, then application 102 may select a target size of the dimension of the template replica that is greater than the default size so that it can accommodate the rendered instance of the inner control. Alternatively, if the read API call result indicates that the size of the dimension of the rendered instance of the inner control is sufficiently small, then application 102 may select a target size of the dimension of the template replica that is smaller than the default size so as to reduce an amount of blank space within the template replica. Furthermore, if the read API call result indicates that the size of the dimension of the rendered instance of the inner control is such that it will be suitably accommodated by the default size of the template replica, then application 102 may set the target size to the default size.

Although step 406C is described in terms of accommodating a single rendered inner control, it should be understood that the target size of the template replica may be selected so as to accommodate the size of multiple rendered inner controls.

At step 406D, a write API call is scheduled to the GUI-rendering component that instructs the GUI-rendering component to update the dimension of the template replica to the target size. For example, and with continued reference to FIG. 1, application 102 may schedule a write API call to GUI-rendering component 106 that instructs GUI-rendering component 106 to update the dimension of the template replica to the target size. In an embodiment, this step comprises scheduling a write to a DOM of a webpage that is maintained by the GUI rendering component to update the dimension of the template replica to the target size.

After step 406, it is determined whether the target size of the dimension of either the first template replica or the second template replica is different than the default size (or any rendered template replica if more than two were rendered). For example, and with continued reference to FIG. 1, application 102 may determine whether the target size of the dimension of either the first template replica or the second template replica is different than the default size.

At step 408, in response to determining that the target size of the dimension of the first template replica or the second template replica is different than the default size, steps 408A and 408B are performed. For example, and with continued reference to FIG. 1, application 102 may perform steps 408A and 408B in response to determining that the target size of the dimension of the first template replica or the second template replica is different than the default size.

At step 408A, a write API call is placed to the GUI-rendering component for each of the first template replica and second template replica to update the offset associated therewith. For example, and with continued reference to FIG. 1, application 102 may place a write API call to GUI-rendering component 106 for each of the first template replica and the second template replica to update the offset associated therewith. In an embodiment, this step comprises writing to a DOM of a webpage that is maintained by the GUI rendering component to update the offsets associated with the template replicas. The offsets are modified to account for the fact that the target size of at least one of the template replicas is different than the default size at which it was originally rendered. Thus, for example, if the target size of one of the template replicas is greater than the default size, then the offset of any template replica following that one must be changed to account for this.

At step 408B, the write API calls that were scheduled during each iteration of step 406D are placed to the GUI-rendering component to update the dimensions of the template replicas to their respective target sizes. For example, and with continued reference to FIG. 1, application 102 may place the write API calls that were scheduled during each iteration of step 406D to GUI-rendering component 106 to update the dimensions of the template replicas to their respective target sizes. In an embodiment, this step comprises writing to a DOM of a webpage that is maintained by the GUI rendering component to update the dimensions of the template replicas to their respective target sizes.

It is noted that step 408 is only performed in response to determining that the target size of the dimension of the first template replica or the second template replica is different than the default size. This is because, if the target size of any of the template replicas have not changed, then there is no need to update the dimension size or offset of any of the template replicas.

It can be seen that, in accordance with the foregoing method, all the read API calls to the GUI-rendering component are placed during each iteration of step 406B and before any of the write API calls are placed in steps 408A and 408B. By handling the read and write API operations in this manner, embodiments in which the GUI-rendering component comprises a browser can reduce a phenomenon known as browser thrashing in which multiple instances of reads to a DOM followed by writes can cause all or a portion of the DOM to have to be re-laid out (or "reflowed") by the browser. This can cause the GUI to appear slow to update to the user, especially on low power devices. In accordance with this implementation, the reads and writes are batched together such that the DOM only needs to be reflowed once.

In one embodiment of the foregoing method of flowchart 400, each of the first template replica and the second template replica is substantially rectangular in shape and the dimension of each of the first template replica and the second template replica that is dynamically resized is a height. In an alternate embodiment, each of the first template replica and the second template replica is substantially rectangular in shape and the dimension of each of the first template replica and the second template replica that is dynamically resized is a width. For example, the foregoing method may be used to dynamically adjust the width of template replicas instead of the height in an embodiment in which the template replicas are rendered side-by-side (i.e., horizontally) on the application GUI. In still further embodiments, the template replicas may have other shapes not mentioned herein and other dimensions that may be dynamically resized using the foregoing method.

Figure 5:
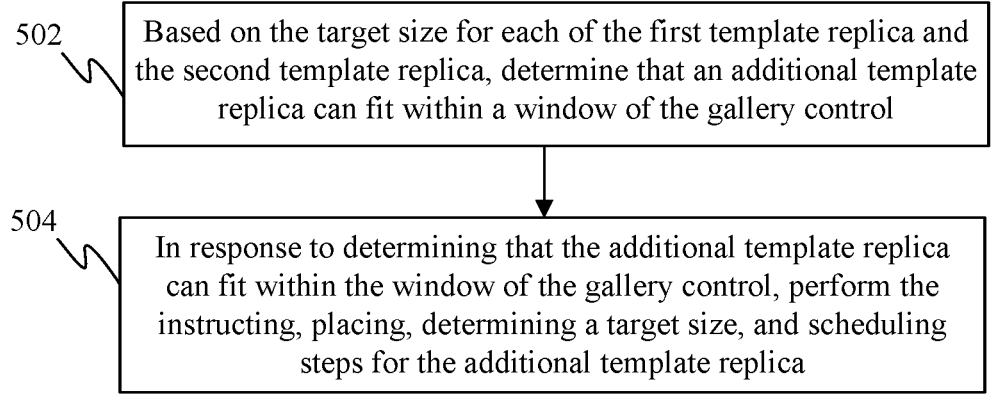
FIG. 5 shows a flowchart of additional steps that may be performed in conjunction with the method described in reference to FIG. 4, in accordance with an example embodiment.

FIG. 5 depicts a flowchart 500 of additional steps that may be performed in conjunction with the method described above in reference to FIG. 4, in accordance with an example embodiment. These steps may be performed, for example, after step 406 but before step 408.

At step 502, based on the target size for each of the first template replica and the second template replica, it is determined that an additional template replica can fit within a window of the gallery control. For example, and with reference to FIG. 1, application 102 may determine that an additional template replica can fit within a window of the gallery control because the target size of either the first template replica, the second template replica, or both, are smaller than the default size. Thus, there is additional room in the window of the gallery control for an additional template replica.

At step 504, in response to determining that the additional template replica can fit within the window of the gallery control, the instructing, placing, determining a target size, and scheduling steps (i.e., steps 406A, 406B, 406C and 406D) are performed for the additional template replica. For example, and with reference to FIG. 1, application 102 performs steps 406A, 406B, 406C, and 406D for the additional template replica in response to determining that an additional template replica can fit within the window of the gallery control.

Figure 6:
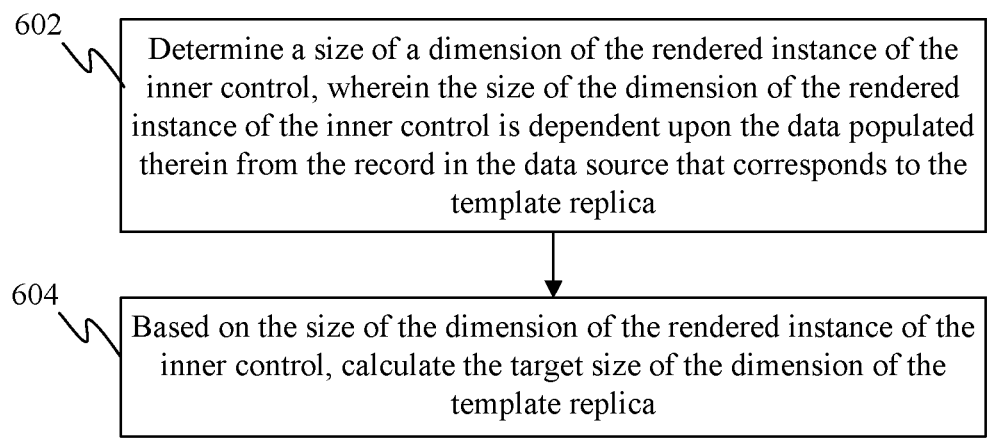
FIG. 6 shows a flowchart of a method for determining a target size of a template replica, in accordance with an example embodiment.

FIG. 6 depicts a flowchart 600 of a method for determining a target size of a template replica, in accordance with an example embodiment. These steps may be performed, for example, as part of step 406C.

At step 602, a size of a dimension of the rendered instance of the inner control is determined, wherein the size of a dimension of the rendered instance of the inner control is dependent upon the data populated therein from the record in the data source that corresponds to the template replica. For example, and with reference to FIG. 1, application 102 may determine a size of a dimension of the rendered instance of the inner control, wherein the size of a dimension of the rendered instance of the inner control is dependent upon the data populated therein from the record in the data source that corresponds to the template replica.

At step 604, based on the size of the dimension of the rendered instance of the inner control, the target size of the dimension of the template replica is calculated. For example, and with reference to FIG. 1, application 102 may calculate the target size of the dimension of the template replica based on the size of the dimension of the rendered instance of the inner control.

Figure 7:
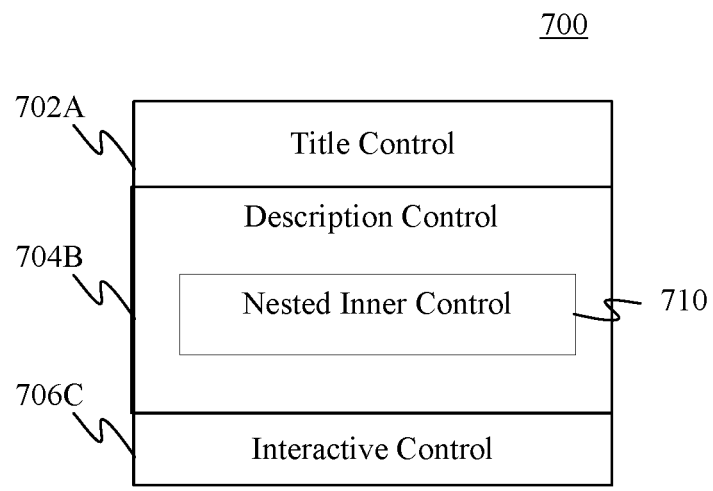
FIG. 7 is a block diagram of an example control template that includes nested inner controls, in accordance with an example embodiment.

FIG. 7 depicts an example control template 700 that includes a nested inner control, in accordance with an example embodiment. As shown in FIG. 7, control template 700 includes three inner controls: an inner control 702A, an inner control 702B, and an inner control 702C. As further shown in FIG. 7, inner control 704B further includes a nested inner control 710. In accordance with embodiments, any inner control within a control template may contain any number of nested inner controls. Because this is the case, in embodiments, the size of the dimension of each template replica in a gallery control is determined by first determining the height of the innermost inner controls and then working outward, since the size of a nested inner control will in turn impact the size of an inner control that contains it. Thus, for example, the size of a rendered instance of nested inner control 710 will be determined prior to determining the size of a rendered instance of inner control 704B. In this sense, the determination of the template replica size will be last since it is dependent on the size of the inner controls.

Figure 8:
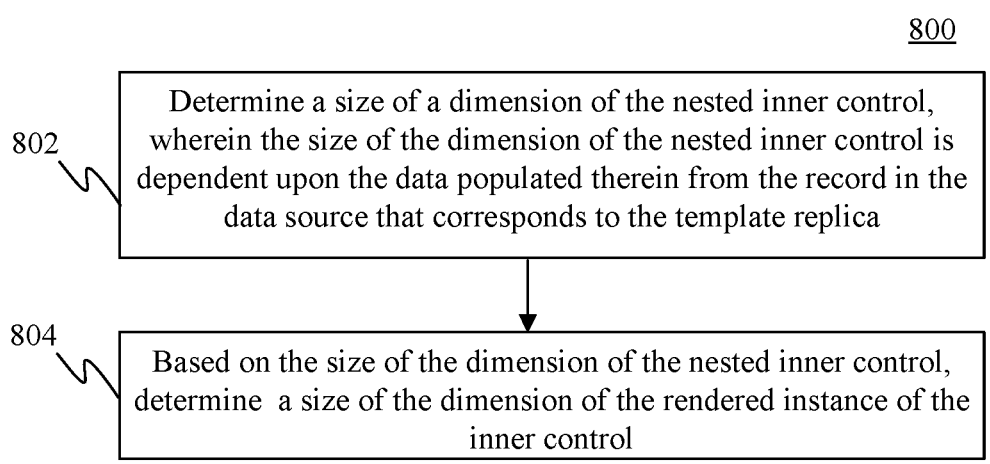
FIG. 8 shows a flowchart of a method for determining a size of a dimension of a rendered instance of an inner control, in accordance with an example embodiment.

To help illustrate this, FIG. 8 shows a flowchart 800 of a method for determining a size of a dimension of a rendered instance of an inner control, in accordance with an example embodiment. These steps may be performed, for example, as part of step 602.

As step 802, a size of a dimension of the nested inner control is determined. For example, and with reference to FIG. 1 and FIG. 7, application 102 may determine a size of a dimension of nested inner control 710.

At step 804, a size of the dimension of the rendered instance of the inner control is determined based on the size of the dimension of the nested inner control that was determined during step 802. For example, and with continued reference to FIG. 1 and FIG. 7, application 102 determines a size of the dimension of inner control 704B based on the size of the dimension of nested inner control 710.

Since each template replica in the gallery control is dynamically sized to accommodate the inner control(s) that are rendered therein, if the size (e.g., height) or position of an inner control changes due to a data change or for some other reasons, then a template replica may no longer be the appropriate size. Thus, in embodiments, after the template replicas have been rendered, the gallery control is monitored (e.g., by listening for notifications for any DOM sub tree modifications from GUI-rendering component 106 in an embodiment in which GUI-rendering component 106 is a browser) to determine if the size of any template replica should be updated. In response to receiving such a notification, application 102 may update the size and offsets associated with the template replicas accordingly.

Figure 9:
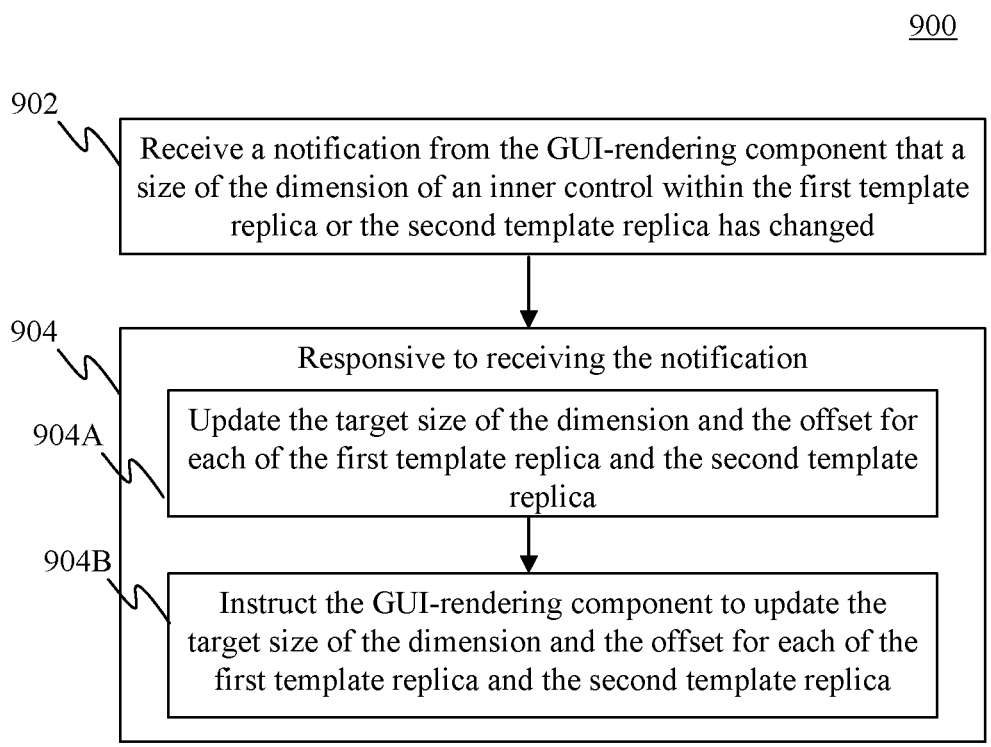
FIG. 9 shows a flowchart of additional steps that may be performed in conjunction with the method described in reference to FIG. 4, in accordance with an example embodiment.

This process is shown in FIG. 9. In particular, FIG. 9 shows a flowchart 900 of additional steps that may be performed in conjunction with the method described in reference to FIG. 4, in accordance with an example embodiment. These steps may be performed, for example, once step 408 is complete.

At step 902, a notification is received from the GUI-rendering component that a size of the dimension of an inner control within the first template replica or the second template replica has changed. For example, and with reference to FIG. 1, application 102 receives a notification from GUI-rendering component 106 that a size of the dimension of an inner control within the first template replica or the second template replica has changed.

At step 904, in response to receiving the notification, steps 904A and 904B are performed. At step 904A, the target size of the dimension and the offset for each of the first template replica and the second template replica are updated. For example, and with reference to FIG. 1, application 102 may updates the target size of the dimension and the offset for each of the first template replica and the second template replica. At step 904B, the GUI-rendering component is instructed to update the target size of the dimension and the offset for each of the first template replica and the second template replica. For example, and with reference to FIG. 1, application 102 instructs GUI-rendering component 106 to update the target size of the dimension and the offset for each of the first template replica and the second template replica.

III. Example Mobile and Stationary Device Embodiments

The aforementioned systems (e.g., the system shown in FIG. 1) and methods (e.g., the methods shown in FIGS. 4-6, 8, and 9) may be implemented in hardware, or hardware combined with software and/or firmware. For example, application 102, application runtime engine 104, GUI-rendering component 106, and application UI 108 of system 100 and the methods of the flowcharts shown in FIGS. 4-6, 8, and 9 may each be implemented as computer program code/instructions configured to be executed in one or more processors and stored in a computer readable storage medium. Alternatively, these components of system 100 and methods may be implemented as hardware logic/electrical circuitry.

Figure 10:
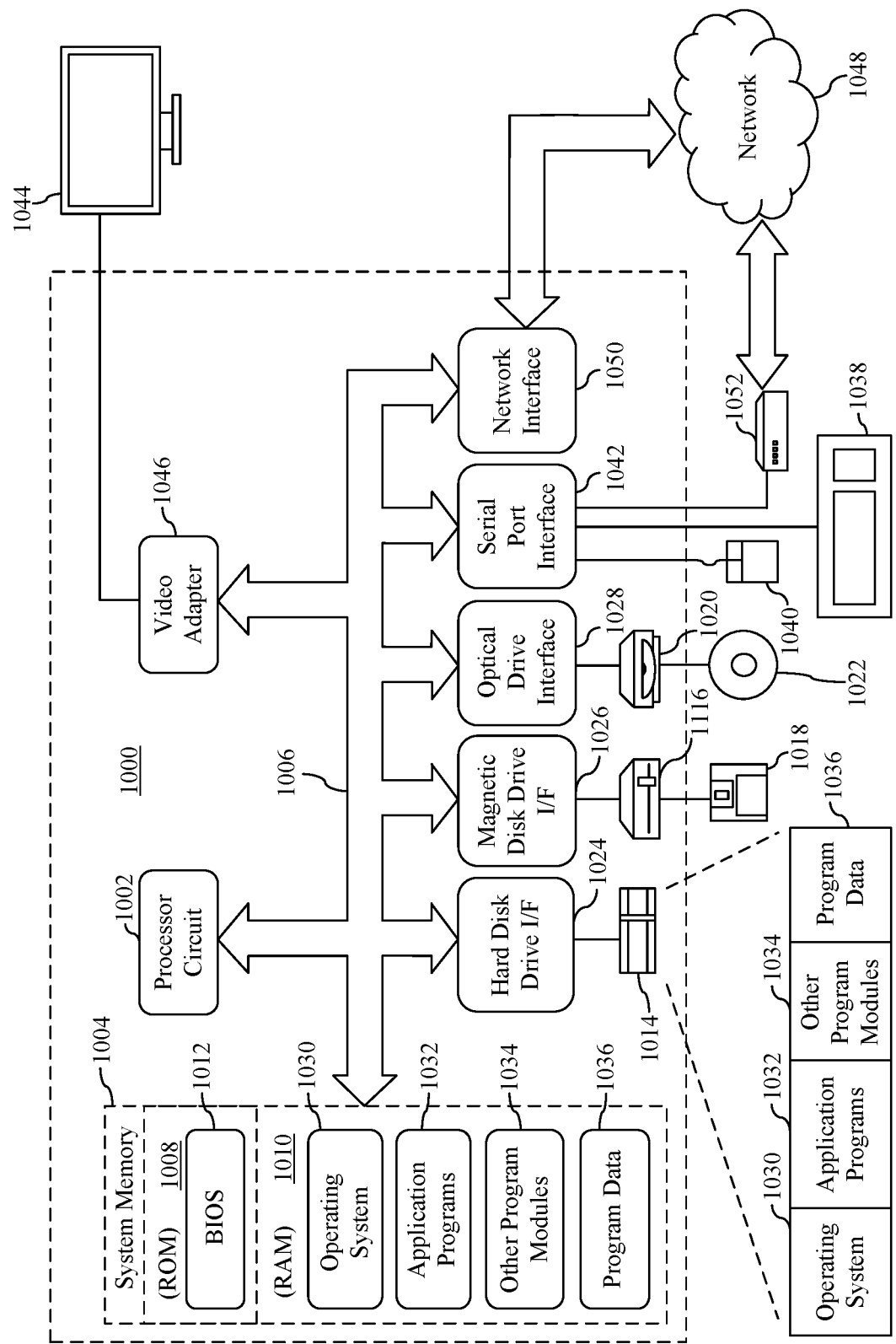
FIG. 10 shows a block diagram of an example computing device that may be used to implement various embodiments.

FIG. 10 depicts a block diagram of an example computing device 1000 that may be used to implement various embodiments. For example, one or more of application 102, application runtime engine 104, GUI-rendering component 106, and application UI 108 of system 100 may be implemented in one or more computing devices similar to computing device 1000 in stationary or mobile computer embodiments, including one or more features of application 102, application runtime engine 104, GUI-rendering component 106, and application UI 108 of system 100 and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1100 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media. A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing the systems described above, including the system described in reference to FIG. 1, and the methods described in reference to FIGS. 4-6, 8, and 9.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A system is described herein. The system includes a processor; and a memory connected to the processor, the memory storing computer program logic for execution by the processor, the computer program logic being configured to render a gallery control to a graphical user interface (GUI), by: initializing a dimension of a first template replica and a second template replica of the gallery control to a default size, each of the first template replica and the second template replica comprising an instance of a predefined template that includes an inner control; determining an offset for each of the first template replica and the second template replica based on the default size, the offset defining a rendering distance from a common starting point; for each of the first template replica and the second template replica: instructing a GUI-rendering component to render the template replica to the GUI at the offset corresponding to the template replica and using the default size, the rendering including: populating an instance of the inner control of the predefined template with data obtained from a record in a data source that corresponds to the template replica; and rendering the instance of the inner control to the GUI; placing a read API call to the GUI-rendering component; based on a result of the read API call, determining a target size of the dimension of the template replica that will accommodate the rendered instance of the inner control; scheduling a write API call to the GUI-rendering component that instructs the GUI-rendering component to update the dimension of the template replica to the target size; and in response to determining that the target size of the dimension of the first template replica or the second template replica is different than the default size: placing a write API call to the GUI-rendering component for each of the first template replica and second template replica to update the offset associated therewith; and placing the scheduled write API calls to the GUI-rendering component.

In one embodiment of the foregoing system, each of the first template replica and the second template replica is substantially rectangular in shape and wherein the dimension of each of the first template replica and the second template replica is a height or a width.

In another embodiment of the foregoing system, the computer program logic is further configured to render the gallery control to the GUI by, after performing the instructing, placing, determining a target size, and scheduling steps for each of the first template replica and the second template replica: based on the target size for each of the first template replica and the second template replica, determining that an additional template replica can fit within a window of the gallery control; and in response to determining that the additional template replica can fit within the window of the gallery control, performing the instructing, placing, determining a target size, and scheduling steps for the additional template replica.

In yet another embodiment of the foregoing system, determining the target size of the dimension of the template replica comprises: determining a size of a dimension of the rendered instance of the inner control, wherein the size of the dimension of the rendered instance of the inner control is dependent upon the data populated therein from the record in the data source that corresponds to the template replica; and based on the size of the dimension of the rendered instance of the inner control, calculating the target size of the dimension of the template replica.

In still another embodiment of the foregoing system, the rendered instance of the inner control includes a nested inner control into which the data from the corresponding record in the data source is populated, and wherein determining the size of the dimension of the rendered instance of the inner control comprises: determining a size of a dimension of the nested inner control, wherein the size of the dimension of the nested inner control is dependent upon the data populated therein from the record in the data source that corresponds to the template replica; and based on the size of the dimension of the nested inner control, determining a size of the dimension of the rendered instance of the inner control.

In still another embodiment of the foregoing system, the computer program logic is further configured to: identify a set of template replicas to render to the GUI that includes the first template replica and the second template replica, wherein the set of template replicas is identified based at least on the default size, a window size associated with the gallery control, and a scroll offset.

In still another embodiment of the foregoing system, the computer program logic is further configured to: receive a notification from the GUI-rendering component that a size of the dimension of the inner control within the first template replica or the second template replica has changed; and responsive to receiving the notification: update the target size of the dimension and the offset for each of the first template replica and the second template replica; and instruct the GUI-rendering component to update the target size of the dimension and the offset for each of the first template replica and the second template replica.

A method performed by a computing device for rendering a gallery control to a graphical user interface (GUI) is described herein. The method includes initializing a dimension of a first template replica and a second template replica of the gallery control to a default size, each of the first template replica and the second template replica comprising an instance of a predefined template that includes an inner control, determining an offset for each of the first template replica and the second template replica based on the default size, the offset defining a rendering distance from a common starting point, for each of the first template replica and the second template replica: instructing a GUI-rendering component to render the template replica to the GUI at the offset corresponding to the template replica and using the default size, the rendering including: populating an instance of the inner control of the predefined template with data obtained from a record in a data source that corresponds to the template replica; and rendering the instance of the inner control to the GUI; placing a read API call to the GUI-rendering component; based on a result of the read API call, determining a target size of the dimension of the template replica that will accommodate the rendered instance of the inner control; scheduling a write API call to the GUI-rendering component that instructs the GUI-rendering component to update the dimension of the template replica to the target size; and in response to determining that the target size of the dimension of the first template replica or the second template replica is different than the default size: placing a write API call to the GUI-rendering component for each of the first template replica and second template replica to update the offset associated therewith; and placing the scheduled write API calls to the GUI-rendering component.

In one embodiment of the foregoing method, each of the first template replica and the second template replica is substantially rectangular in shape and wherein the dimension of each of the first template replica and the second template replica is a height or a width.

In another embodiment of the foregoing method, after performing the instructing, placing, determining a target size, and scheduling steps for each of the first template replica and the second template replica, the method further comprises: based on the target size for each of the first template replica and the second template replica, determining that an additional template replica can fit within a window of the gallery control; and in response to determining that the additional template replica can fit within the window of the gallery control, performing the instructing, placing, determining a target size, and scheduling steps for the additional template replica.

In yet another embodiment of the foregoing method, determining the target size of the dimension of the template replica comprises: determining a size of a dimension of the rendered instance of the inner control, wherein the size of the dimension of the rendered instance of the inner control is dependent upon the data populated therein from the record in the data source that corresponds to the template replica; and based on the size of the dimension of the rendered instance of the inner control, calculating the target size of the dimension of the template replica.

In still another embodiment of the foregoing method, the rendered instance of the inner control includes a nested inner control into which the data from the corresponding record in the data source is populated, and determining the size of the dimension of the rendered instance of the inner control comprises: determining a size of a dimension of the nested inner control, wherein the size of the dimension of the nested inner control is dependent upon the data populated therein from the record in the data source that corresponds to the template replica; and based on the size of the dimension of the nested inner control, determining a size of the dimension of the rendered instance of the inner control.

In still another embodiment of the foregoing method, the method further comprises identifying a set of template replicas to render to the GUI that includes the first template replica and the second template replica, wherein the set of template replicas is identified based at least on the default size, a window size associated with the gallery control, and a scroll offset.

In still another embodiment of the foregoing method, the method further comprises receiving a notification from the GUI-rendering component that a size of the dimension of the inner control within the first template replica or the second template replica has changed; and responsive to receiving the notification: updating the target size of the dimension and the offset for each of the first template replica and the second template replica; and instructing the GUI-rendering component to update the target size of the dimension and the offset for each of the first template replica and the second template replica.

A computer program product is also described herein. The computer program product comprises a computer-readable memory having computer program logic recorded thereon that when executed by at least one processor causes the at least one processor to perform a method for rendering a gallery control to a graphical user interface (GUI), the method comprising: initializing a dimension of a first template replica and a second template replica of the gallery control to a default size, each of the first template replica and the second template replica comprising an instance of a predefined template that includes an inner control; determining an offset for each of the first template replica and the second template replica based on the default size, the offset defining a rendering distance from a common starting point; for each of the first template replica and the second template replica: instructing a GUI-rendering component to render the template replica to the GUI at the offset corresponding to the template replica and using the default size, the rendering including: populating an instance of the inner control of the predefined template with data obtained from a record in a data source that corresponds to the template replica; and rendering the instance of the inner control to the GUI; placing a read API call to the GUI-rendering component; based on a result of the read API call, determining a target size of the dimension of the template replica that will accommodate the rendered instance of the inner control; scheduling a write API call to the GUI-rendering component that instructs the GUI-rendering component to update the dimension of the template replica to the target size; and in response to determining that the target size of the dimension of the first template replica or the second template replica is different than the default size: placing a write API call to the GUI-rendering component for each of the first template replica and second template replica to update the offset associated therewith; and placing the scheduled write API calls to the GUI-rendering component.

In one embodiment of the foregoing computer program product, each of the first template replica and the second template replica is substantially rectangular in shape and wherein the dimension of each of the first template replica and the second template replica is a height or a width.

In another embodiment of the foregoing computer program product, after performing the instructing, placing, determining a target size, and scheduling steps for each of the first template replica and the second template replica, the method further comprising: based on the target size for each of the first template replica and the second template replica, determining that an additional template replica can fit within a window of the gallery control; and in response to determining that the additional template replica can fit within the window of the gallery control, performing the instructing, placing, determining a target size, and scheduling steps for the additional template replica.

In yet another embodiment of the foregoing computer program product, the determining the target size of the dimension of the template replica comprises: determining a size of a dimension of the rendered instance of the inner control, wherein the size of the dimension of the rendered instance of the inner control is dependent upon the data populated therein from the record in the data source that corresponds to the template replica; and based on the size of the dimension of the rendered instance of the inner control, calculating the target size of the dimension of the template replica.

In still another embodiment of the foregoing computer program product, the rendered instance of the inner control includes a nested inner control into which the data from the corresponding record in the data source is populated, and wherein determining the size of the dimension of the rendered instance of the inner control comprises: determining a size of a dimension of the nested inner control, wherein the size of the dimension of the nested inner control is dependent upon the data populated therein from the record in the data source that corresponds to the template replica; and based on the size of the dimension of the nested inner control, determining a size of a dimension of the rendered instance of the inner control.

In still another embodiment of the foregoing computer program product, the method further comprises: receiving a notification from the GUI-rendering component that a size of the dimension of the inner control within the first template replica or the second template replica has changed; and responsive to receiving the notification: updating the target size of the dimension and the offset for each of the first template replica and the second template replica; and instructing the GUI-rendering component to update the target size of the dimension and the offset for each of the first template replica and the second template replica.

V. Conclusion

While various embodiments of the present invention have been described above, it should be understood that they have been presented by way of example only, and not limitation.

It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
   a processor; and
   a memory connected to the processor, the memory storing computer program logic for execution by the processor, the computer program logic being configured to render a gallery control to a graphical user interface (GUI), by:
   initializing a dimension of a first template replica and a second template replica of the gallery control to a default size, each of the first template replica and the second template replica comprising an instance of a predefined template that includes an inner control;
   determining an offset for each of the first template replica and the second template replica based on the default size, the offset defining a rendering distance from a common starting point;
   for each of the first template replica and the second template replica:
     instructing a GUI-rendering component to render the template replica to the GUI at the offset corresponding to the template replica and using the default size, the rendering including:
       populating an instance of the inner control of the predefined template with data obtained from a record in a data source that corresponds to the template replica; and
       rendering the instance of the inner control to the GUI;
     placing a read API call to the GUI-rendering component;
     based on a result of the read API call, determining a target size of the dimension of the template replica that will accommodate the rendered instance of the inner control;
     scheduling a write API call to the GUI-rendering component that instructs the GUI-rendering component to update the dimension of the template replica to the target size; and
   in response to determining that the target size of the dimension of the first template replica or the second template replica is different than the default size:
     placing a write API call to the GUI-rendering component for each of the first template replica and second template replica to update the offset associated therewith; and
     placing the scheduled write API calls to the GUI-rendering component.

2. The system of claim 1, wherein each of the first template replica and the second template replica is substantially rectangular in shape and wherein the dimension of each of the first template replica and the second template replica is a height or a width.

3. The system of claim 1, wherein the computer program logic is further configured to render the gallery control to the GUI by, after performing the instructing, placing, determining a target size, and scheduling steps for each of the first template replica and the second template replica:
   based on the target size for each of the first template replica and the second template replica, determining that an additional template replica can fit within a window of the gallery control; and in response to determining that the additional template replica can fit within the window of the gallery control, performing the instructing, placing, determining a target size, and scheduling steps for the additional template replica.

4. The system of claim 1, wherein determining the target size of the dimension of the template replica comprises:

determining a size of a dimension of the rendered instance of the inner control, wherein the size of the dimension of the rendered instance of the inner control is dependent upon the data populated therein from the record in the data source that corresponds to the template replica; and based on the size of the dimension of the rendered instance of the inner control, calculating the target size of the dimension of the template replica.

5. The system of claim 1, wherein the rendered instance of the inner control includes a nested inner control into which the data from the corresponding record in the data source is populated, and wherein determining the size of the dimension of the rendered instance of the inner control comprises:

determining a size of a dimension of the nested inner control, wherein the size of the dimension of the nested inner control is dependent upon the data populated therein from the record in the data source that corresponds to the template replica; and based on the size of the dimension of the nested inner control, determining a size of the dimension of the rendered instance of the inner control.

6. The system of claim 1, wherein the computer program logic is further configured to render the gallery control to the GUI by:

identifying a set of template replicas to render to the GUI that includes the first template replica and the second template replica, wherein the set of template replicas is identified based at least on the default size, a window size associated with the gallery control, and a scroll offset.

7. The system of claim 1, wherein the computer program logic is further configured to:

receive a notification from the GUI-rendering component that a size of the dimension of the inner control within the first template replica or the second template replica has changed; and responsive to receiving the notification:

update the target size of the dimension and the offset for each of the first template replica and the second template replica; and instruct the GUI-rendering component to update the target size of the dimension and the offset for each of the first template replica and the second template replica.

8. A method performed by a computing device for rendering a gallery control to a graphical user interface (GUI), the method comprising:

initializing a dimension of a first template replica and a second template replica of the gallery control to a default size, each of the first template replica and the second template replica comprising an instance of a predefined template that includes an inner control;

determining an offset for each of the first template replica and the second template replica based on the default size, the offset defining a rendering distance from a common starting point;

for each of the first template replica and the second template replica:

instructing a GUI-rendering component to render the template replica to the GUI at the offset corresponding to the template replica and using the default size, the rendering including:

populating an instance of the inner control of the predefined template with data obtained from a record in a data source that corresponds to the template replica; and rendering the instance of the inner control to the GUI;

placing a read API call to the GUI-rendering component;

based on a result of the read API call, determining a target size of the dimension of the template replica that will accommodate the rendered instance of the inner control;

scheduling a write API call to the GUI-rendering component that instructs the GUI-rendering component to update the dimension of the template replica to the target size; and in response to determining that the target size of the dimension of the first template replica or the second template replica is different than the default size:

placing a write API call to the GUI-rendering component for each of the first template replica and second template replica to update the offset associated therewith; and placing the scheduled write API calls to the GUI-rendering component.

9. The method of claim 8, wherein each of the first template replica and the second template replica is substantially rectangular in shape and wherein the dimension of each of the first template replica and the second template replica is a height or a width.

10. The method of claim 8, further comprising, after performing the instructing, placing, determining a target size, and scheduling steps for each of the first template replica and the second template replica:

based on the target size for each of the first template replica and the second template replica, determining that an additional template replica can fit within a window of the gallery control; and in response to determining that the additional template replica can fit within the window of the gallery control, performing the instructing, placing, determining a target size, and scheduling steps for the additional template replica.

11. The method of claim 8, wherein determining the target size of the dimension of the template replica comprises:

determining a size of a dimension of the rendered instance of the inner control, wherein the size of the dimension of the rendered instance of the inner control is dependent upon the data populated therein from the record in the data source that corresponds to the template replica; and based on the size of the dimension of the rendered instance of the inner control, calculating the target size of the dimension of the template replica.

12. The method of claim 11, wherein the rendered instance of the inner control includes a nested inner control into which the data from the corresponding record in the data source is populated, and wherein determining the size of the dimension of the rendered instance of the inner control comprises:

determining a size of a dimension of the nested inner control, wherein the size of the dimension of the nested inner control is dependent upon the data populated therein from the record in the data source that corresponds to the template replica; and based on the size of the dimension of the nested inner control, determining a size of the dimension of the rendered instance of the inner control.

13. The method of claim 8, further comprising:

identifying a set of template replicas to render to the GUI that includes the first template replica and the second template replica, wherein the set of template replicas is identified based at least on the default size, a window size associated with the gallery control, and a scroll offset.

14. The method of claim 8, further comprising:

receiving a notification from the GUI-rendering component that a size of the dimension of the inner control within the first template replica or the second template replica has changed; and responsive to receiving the notification:
   updating the target size of the dimension and the offset for each of the first template replica and the second template replica; and
   instructing the GUI-rendering component to update the target size of the dimension and the offset for each of the first template replica and the second template replica.

15. A computer program product comprising a computer-readable memory having computer program logic recorded thereon that when executed by at least one processor causes the at least one processor to perform a method for rendering a gallery control to a graphical user interface (GUI), the method comprising:

initializing a dimension of a first template replica and a second template replica of the gallery control to a default size, each of the first template replica and the second template replica comprising an instance of a predefined template that includes an inner control;

determining an offset for each of the first template replica and the second template replica based on the default size, the offset defining a rendering distance from a common starting point;

for each of the first template replica and the second template replica:
   instructing a GUI-rendering component to render the template replica to the GUI at the offset corresponding to the template replica and using the default size, the rendering including:
      populating an instance of the inner control of the predefined template with data obtained from a record in a data source that corresponds to the template replica; and
      rendering the instance of the inner control to the GUI;
   placing a read API call to the GUI-rendering component;
   based on a result of the read API call, determining a target size of the dimension of the template replica that will accommodate the rendered instance of the inner control;
   scheduling a write API call to the GUI-rendering component that instructs the GUI-rendering component to update the dimension of the template replica to the target size; and in response to determining that the target size of the dimension of the first template replica or the second template replica is different than the default size:
   placing a write API call to the GUI-rendering component for each of the first template replica and second template replica to update the offset associated therewith; and
   placing the scheduled write API calls to the GUI-rendering component.

16. The computer program product of claim 15, wherein each of the first template replica and the second template replica is substantially rectangular in shape and wherein the dimension of each of the first template replica and the second template replica is a height or a width.

17. The computer program product of claim 15, wherein the method further comprises, after performing the instructing, placing, determining a target size, and scheduling steps for each of the first template replica and the second template replica:

based on the target size for each of the first template replica and the second template replica, determining that an additional template replica can fit within a window of the gallery control; and in response to determining that the additional template replica can fit within the window of the gallery control, performing the instructing, placing, determining a target size, and scheduling steps for the additional template replica.

18. The computer program product of claim 15, wherein determining the target size of the dimension of the template replica comprises:

determining a size of a dimension of the rendered instance of the inner control, wherein the size of the dimension of the rendered instance of the inner control is dependent upon the data populated therein from the record in the data source that corresponds to the template replica; and based on the size of the dimension of the rendered instance of the inner control, calculating the target size of the dimension of the template replica.

19. The computer program product of claim 18, wherein the rendered instance of the inner control includes a nested inner control into which the data from the corresponding record in the data source is populated, and wherein determining the size of the dimension of the rendered instance of the inner control comprises:

determining a size of a dimension of the nested inner control, wherein the size of the dimension of the nested inner control is dependent upon the data populated therein from the record in the data source that corresponds to the template replica; and based on the size of the dimension of the nested inner control, determining a size of the dimension of the rendered instance of the inner control.

20. The computer program product of claim 15, wherein the method further comprises:

receiving a notification from the GUI-rendering component that a size of the dimension of the inner control within the first template replica or the second template replica has changed; and responsive to receiving the notification:
   updating the target size of the dimension and the offset for each of the first template replica and the second template replica; and instructing the GUI-rendering component to update the target size of the dimension and the offset for each of the first template replica and the second template replica.

* * * * *